(12) United States Patent
Wright et al.

(10) Patent No.: US 8,224,353 B2
(45) Date of Patent: Jul. 17, 2012

(54) DISSEMINATING TARGETED LOCATION-BASED CONTENT TO MOBILE DEVICE USERS

(75) Inventors: Andrew S. Wright, Vancouver (CA); Swan Allan, Vancouver (CA); Steven J. Williams, Port Coquitlam (CA); John J. Geyer, Vancouver (CA)

(73) Assignee: Aegis Mobility, Inc., Vancouver, B.C. (CA)

( * ) Notice: Subject to any disclaimer, the term of this patent is extended or adjusted under 35 U.S.C. 154(b) by 594 days.

(21) Appl. No.: 12/235,535

(22) Filed: Sep. 22, 2008
(Under 37 CFR 1.47)

(65) Prior Publication Data

US 2009/0239553 A1    Sep. 24, 2009

Related U.S. Application Data

(60) Provisional application No. 60/974,044, filed on Sep. 20, 2007.

(51) Int. Cl.
*H04W 24/00* (2009.01)
*H04W 4/00* (2009.01)

(52) U.S. Cl. ................................ 455/456.3; 455/466

(58) Field of Classification Search ............ 455/414.1, 455/466, 514, 456.1–456.6, 418–420, 412.1–412.2, 455/517
See application file for complete search history.

(56) References Cited

U.S. PATENT DOCUMENTS

| | | | |
|---|---|---|---|
| 5,852,775 A * | 12/1998 | Hidary ..................... 455/412.1 |
| 5,862,476 A | 1/1999 | Hasegawa | |
| 5,890,067 A | 3/1999 | Chang et al. | |
| 5,963,550 A | 10/1999 | Hirata et al. | |
| 6,154,172 A | 11/2000 | Piccionelli et al. | |
| 6,208,866 B1 * | 3/2001 | Rouhollahzadeh et al. ................. 455/456.5 |
| 6,263,190 B1 | 7/2001 | Mamori et al. | |
| 6,311,078 B1 | 10/2001 | Hardouin | |
| 6,353,778 B1 | 3/2002 | Brown | |
| 6,389,287 B1 | 5/2002 | Smith et al. | |
| 6,418,309 B1 | 7/2002 | Moon et al. | |
| 6,496,709 B2 | 12/2002 | Murray | |
| 6,505,046 B1 * | 1/2003 | Baker ...................... 455/456.3 |
| 6,526,275 B1 * | 2/2003 | Calvert ....................... 455/418 |
| 6,546,257 B1 * | 4/2003 | Stewart ..................... 455/456.3 |
| 6,580,973 B2 | 6/2003 | Leivian et al. | |
| 6,594,483 B2 | 7/2003 | Nykanen et al. | |
| 6,600,975 B2 | 7/2003 | Moriguchi et al. | |
| 6,647,257 B2 * | 11/2003 | Owensby .................. 455/414.1 |
| 6,647,269 B2 * | 11/2003 | Hendrey et al. ........... 455/456.3 |

(Continued)

FOREIGN PATENT DOCUMENTS

EP    1931109 A1    6/2008

(Continued)

*Primary Examiner* — Brandon Miller
(74) *Attorney, Agent, or Firm* — Knobbe Martens Olson & Bear LLP

(57) ABSTRACT

A trusted third party information arbiter for facilitating third party information sources, such as advertisers or data processing services, to accurately target communications to mobile device users. Illustratively, the mobile device users can control target communications through the utilization of discretion requests/permissions processed by the third party information arbiter. Furthermore, the mobile device users may further interact with the trusted third party information arbiter to provide/release additional personal information. For example, a mobile device user may be provided an increasingly rich rewards or payments that may be provisioned by discount, coupons or offers associated with existing or new product advertisements or promotional information messages.

21 Claims, 14 Drawing Sheets

U.S. PATENT DOCUMENTS

| | | |
|---|---|---|
| 6,650,894 B1 | 11/2003 | Berstis et al. |
| 6,678,516 B2 * | 1/2004 | Nordman et al. .......... 455/414.1 |
| 6,690,940 B1 | 2/2004 | Brown et al. |
| 6,701,158 B2 | 3/2004 | Moreth |
| 6,714,519 B2 | 3/2004 | Luzzatti et al. |
| 6,728,542 B2 | 4/2004 | Meda |
| 6,731,925 B2 | 5/2004 | Naboulsi |
| 6,771,946 B1 | 8/2004 | Oyasaki |
| 6,807,435 B2 | 10/2004 | Yamashita |
| 6,816,731 B1 | 11/2004 | Maruyama |
| 6,819,928 B1 | 11/2004 | Hokao |
| 6,832,093 B1 | 12/2004 | Ranta |
| 6,922,571 B1 | 7/2005 | Kinoshita |
| 6,934,547 B2 | 8/2005 | Suzuki |
| 6,961,561 B2 | 11/2005 | Himmel et al. |
| 6,973,333 B1 | 12/2005 | O'Neil |
| 6,978,136 B2 | 12/2005 | Jenniges et al. |
| 7,003,525 B1 | 2/2006 | Horvitz et al. |
| 7,006,793 B2 | 2/2006 | Himmel et al. |
| 7,015,831 B2 | 3/2006 | Karlsson et al. |
| 7,064,656 B2 | 6/2006 | Belcher et al. |
| 7,072,753 B2 | 7/2006 | Eberle et al. |
| 7,110,749 B2 * | 9/2006 | Zellner et al. ............... 455/414.1 |
| 7,149,627 B2 | 12/2006 | Ockerse et al. |
| 7,181,228 B2 | 2/2007 | Boesch |
| 7,242,946 B2 | 7/2007 | Kokkonen et al. |
| 7,330,895 B1 | 2/2008 | Horvitz |
| 7,359,714 B2 * | 4/2008 | Parupudi et al. ........... 455/456.1 |
| 7,394,791 B2 | 7/2008 | Proctor, Jr. |
| 7,403,785 B2 | 7/2008 | Daniels et al. |
| 7,430,724 B2 * | 9/2008 | Othmer ......................... 715/774 |
| 7,813,741 B2 * | 10/2010 | Hendrey et al. ............ 455/456.1 |
| 2002/0168981 A1 | 11/2002 | Meda |
| 2002/0198004 A1 | 12/2002 | Heie et al. |
| 2003/0129995 A1 | 7/2003 | Niwa et al. |
| 2003/0137408 A1 | 7/2003 | Breiner |
| 2003/0143988 A1 | 7/2003 | Jamadagni |
| 2004/0092253 A1 | 5/2004 | Simonds et al. |
| 2004/0198332 A1 | 10/2004 | Lundsgaard |
| 2004/0203900 A1 * | 10/2004 | Cedervall et al. .......... 455/456.1 |
| 2004/0248589 A1 | 12/2004 | Gwon et al. |
| 2004/0253963 A1 | 12/2004 | Park et al. |
| 2005/0037760 A1 | 2/2005 | Maruyama |
| 2005/0096026 A1 | 5/2005 | Chitrapu et al. |
| 2005/0119002 A1 | 6/2005 | Bauchot et al. |
| 2005/0153680 A1 | 7/2005 | Yoshioka et al. |
| 2005/0255874 A1 | 11/2005 | Stewart-Baxter et al. |
| 2005/0261011 A1 | 11/2005 | Scott |
| 2005/0264404 A1 | 12/2005 | Franczyk et al. |
| 2006/0040640 A1 | 2/2006 | Thompson et al. |
| 2006/0046765 A1 | 3/2006 | Kogure |
| 2006/0099940 A1 | 5/2006 | Pfleging et al. |
| 2006/0099959 A1 | 5/2006 | Staton et al. |
| 2006/0099969 A1 | 5/2006 | Staton et al. |
| 2006/0104297 A1 | 5/2006 | Buyukkoc et al. |
| 2006/0116807 A1 | 6/2006 | Hijikata |
| 2006/0148490 A1 | 7/2006 | Bates et al. |
| 2006/0211412 A1 | 9/2006 | Vance |
| 2006/0217130 A1 | 9/2006 | Rowitch et al. |
| 2006/0293842 A1 | 12/2006 | Casino |
| 2007/0072553 A1 | 3/2007 | Barbera |
| 2007/0072616 A1 | 3/2007 | Irani |
| 2007/0082678 A1 | 4/2007 | Himmelstein |
| 2007/0287474 A1 | 12/2007 | Jenkins et al. |
| 2008/0061988 A1 | 3/2008 | Mock et al. |

FOREIGN PATENT DOCUMENTS

| | | |
|---|---|---|
| WO | WO2006/070253 A2 | 7/2006 |
| WO | WO2008/109477 A1 | 9/2008 |

* cited by examiner

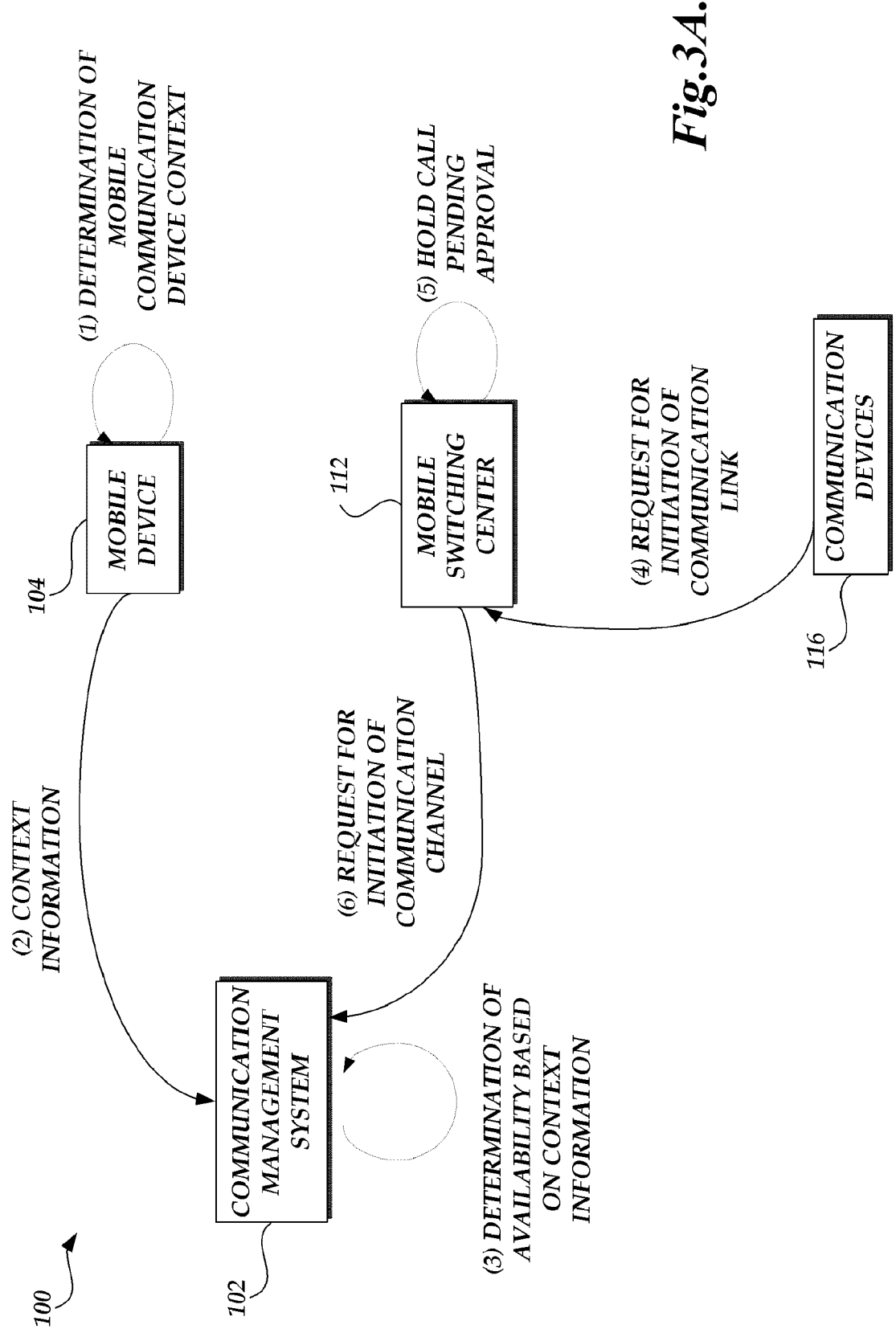

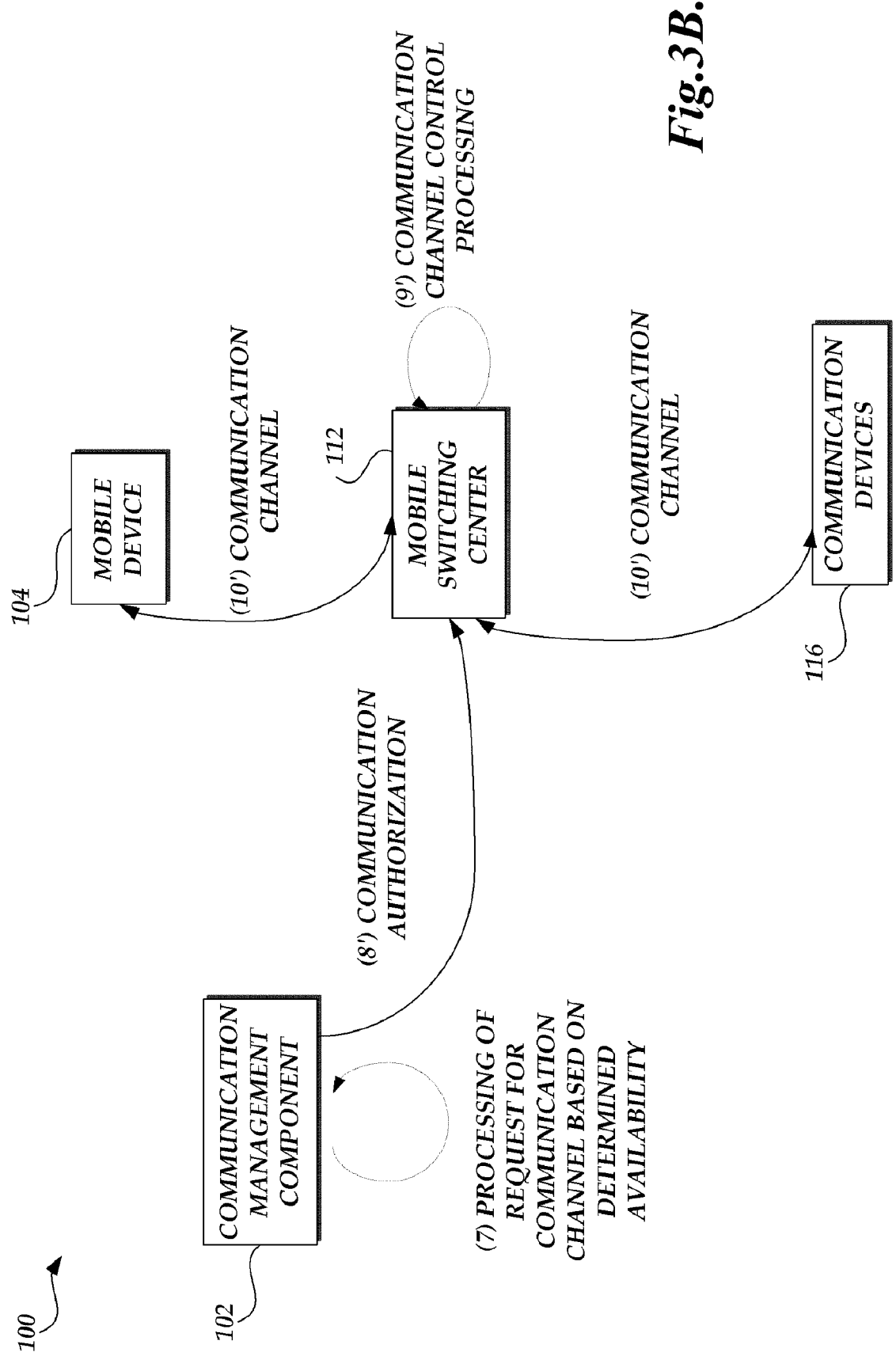

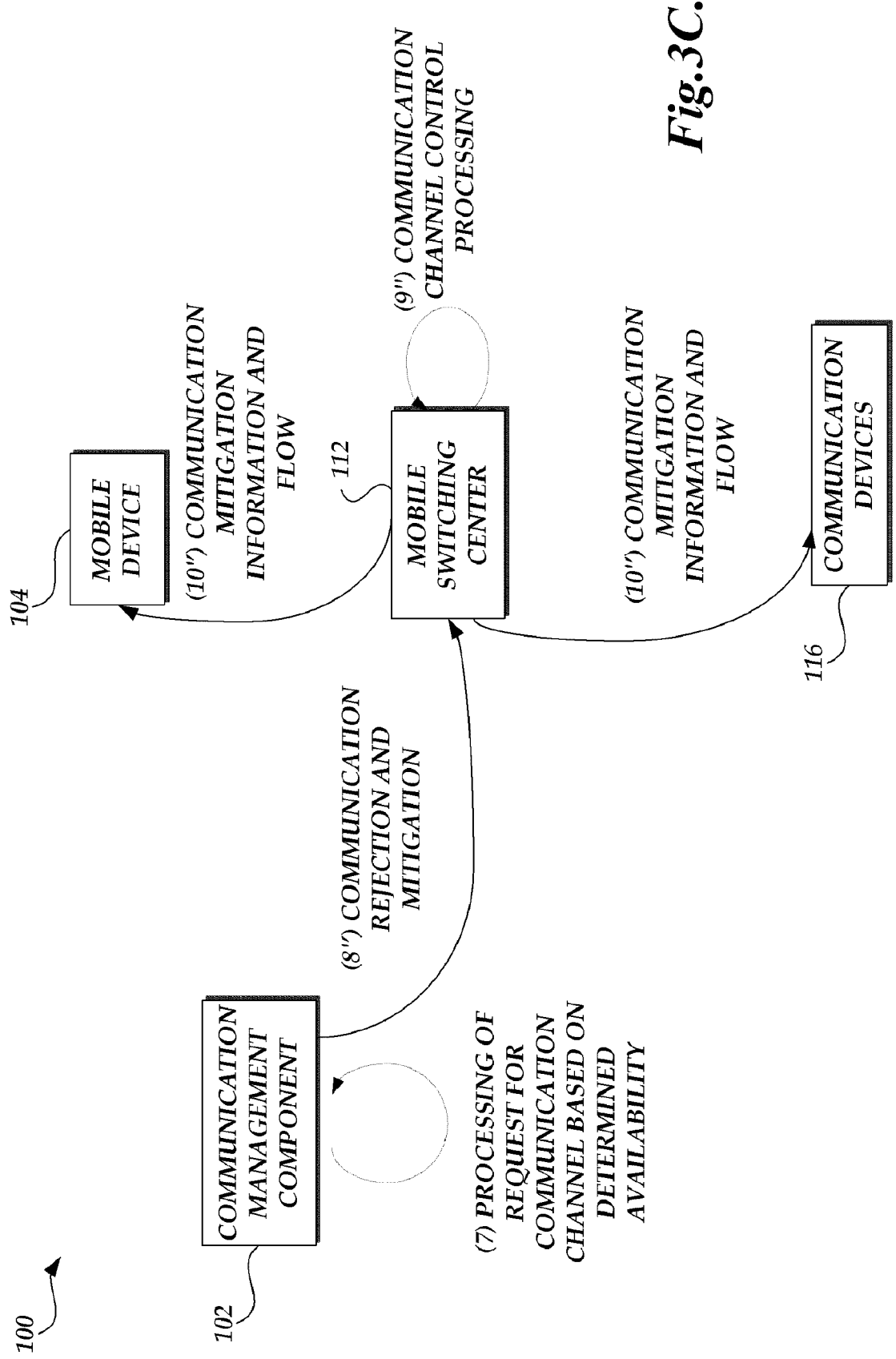

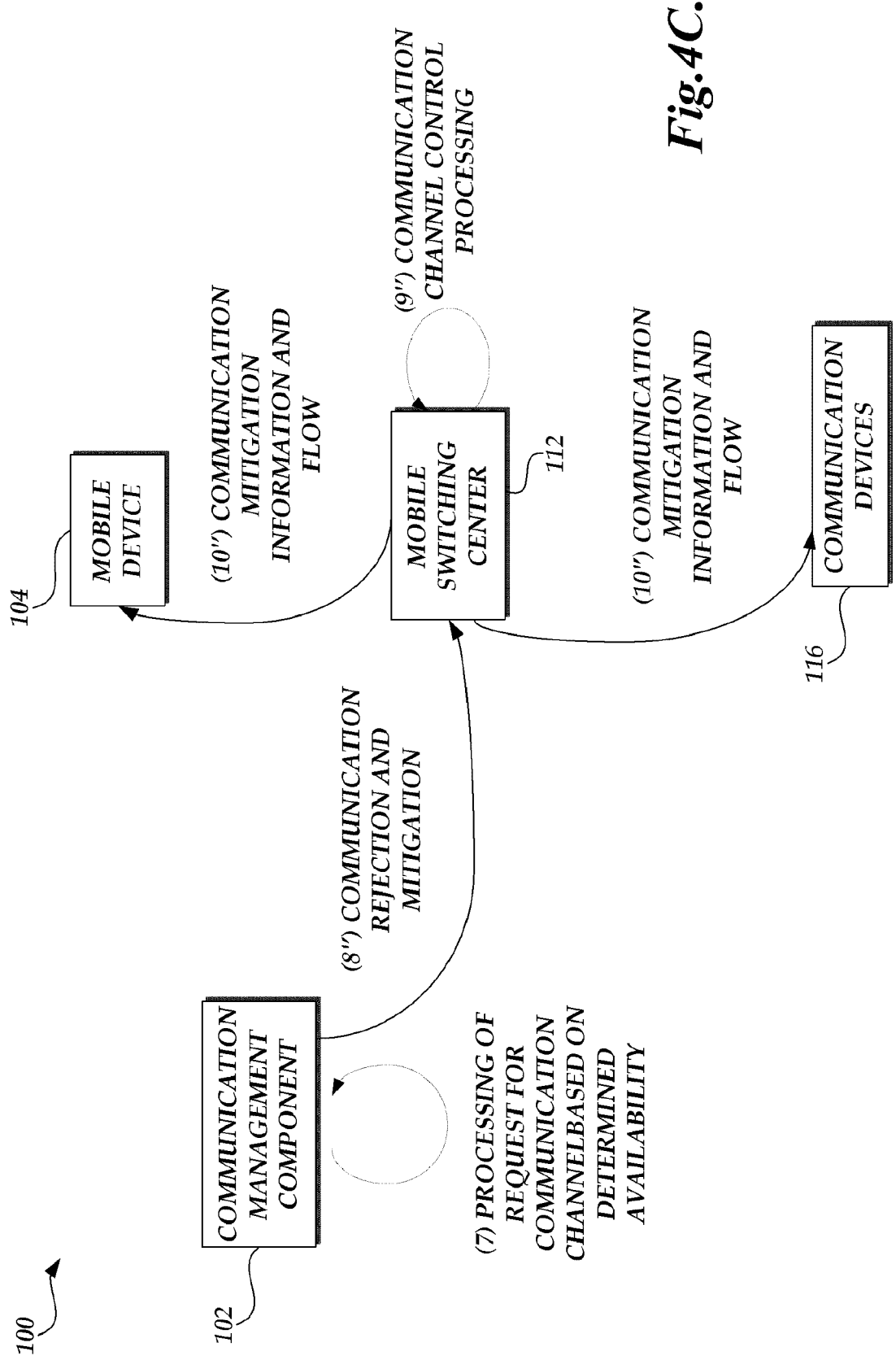

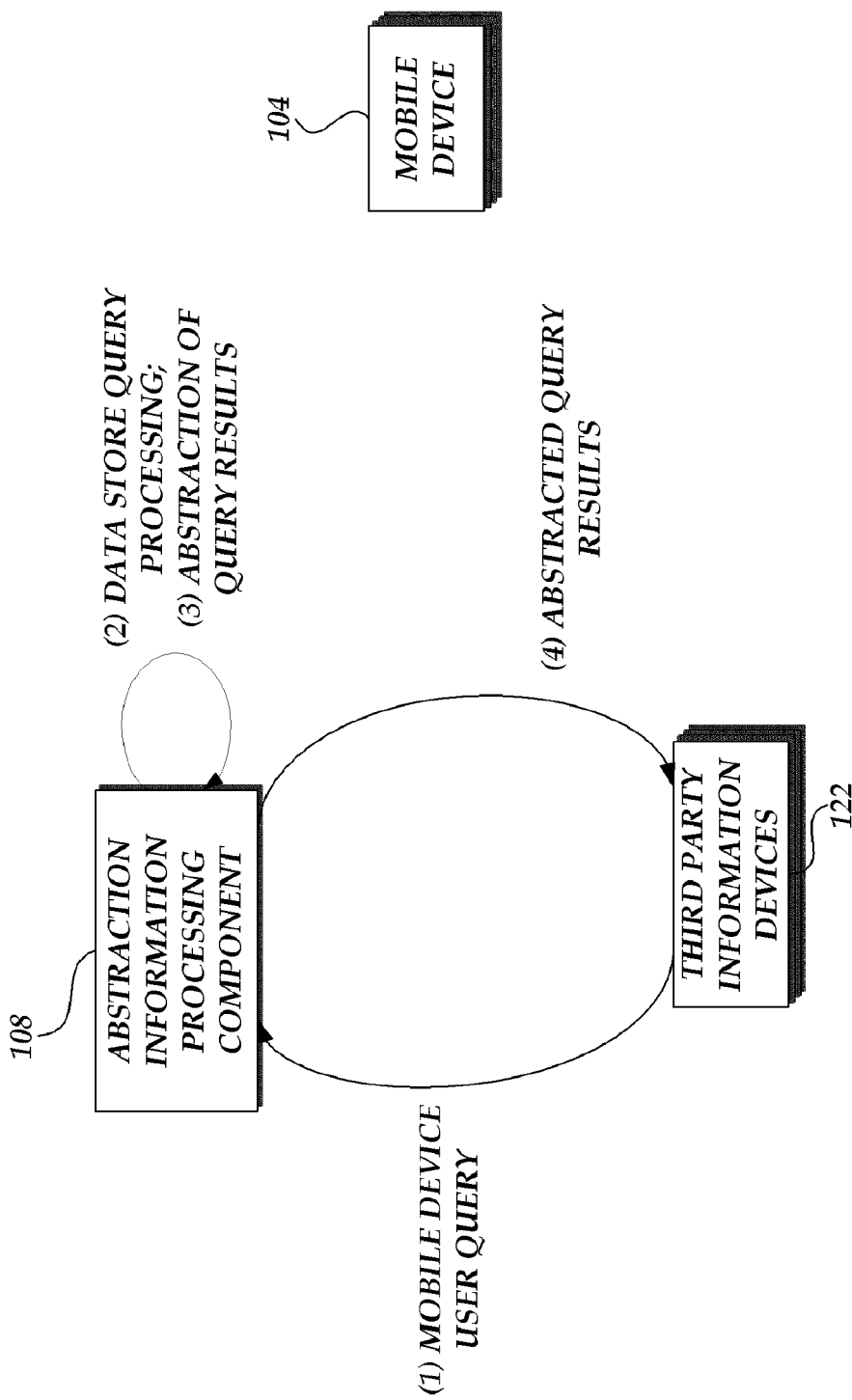

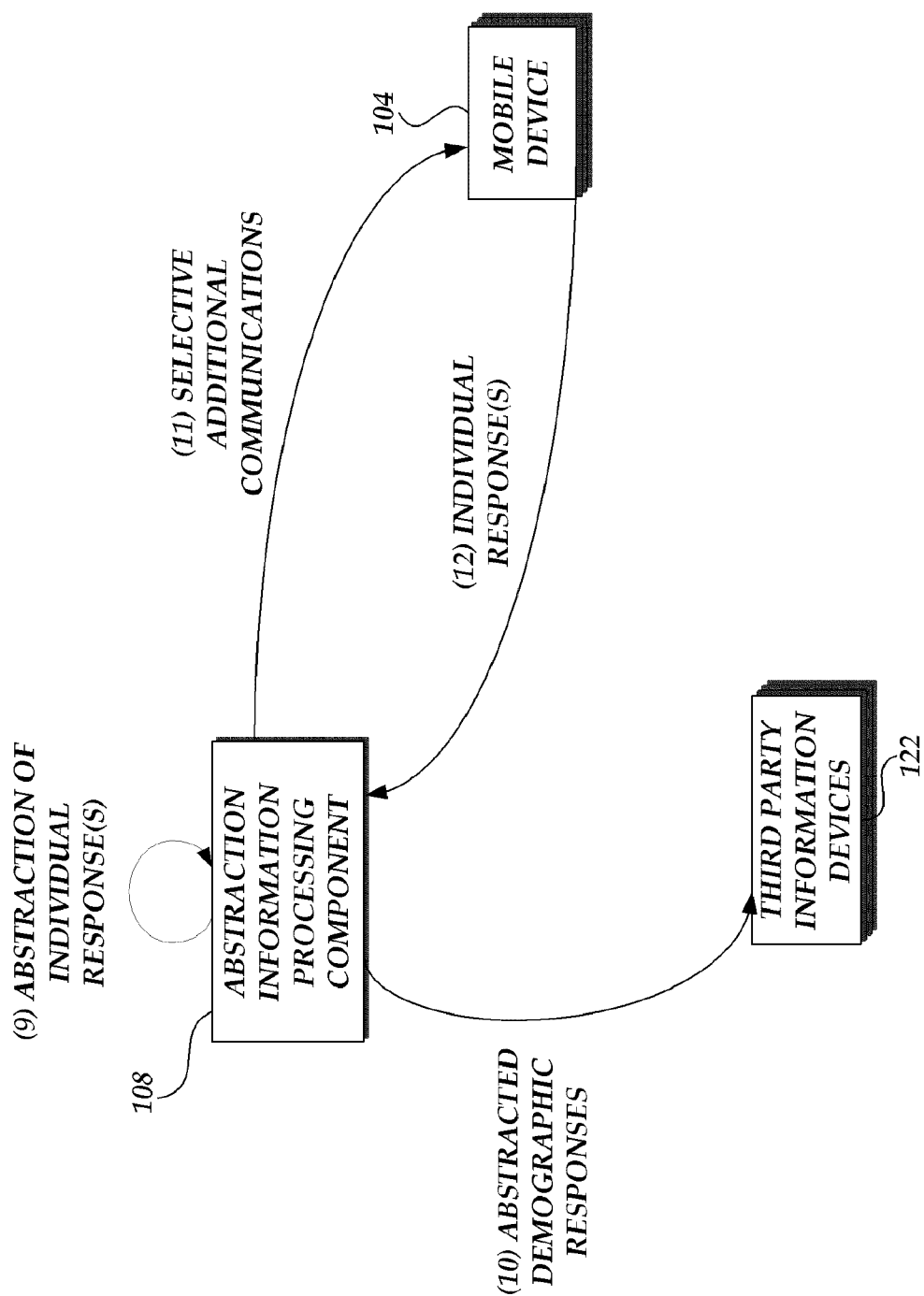

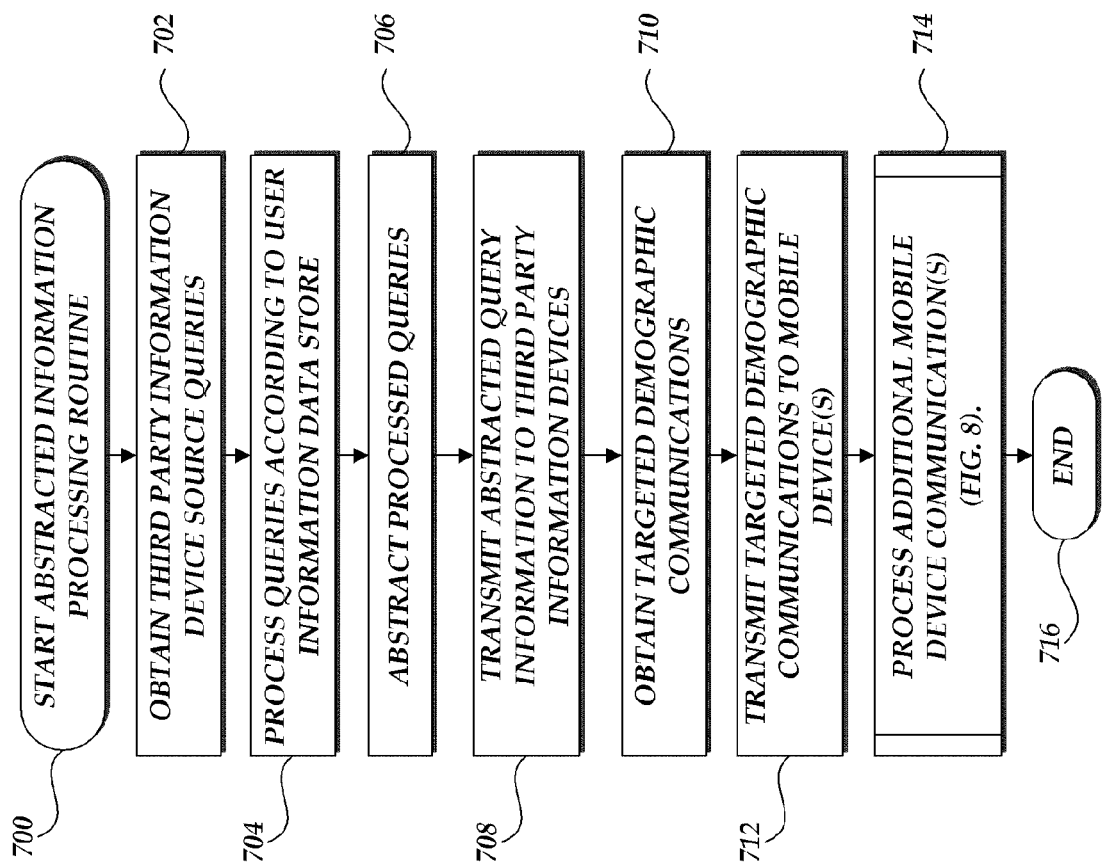

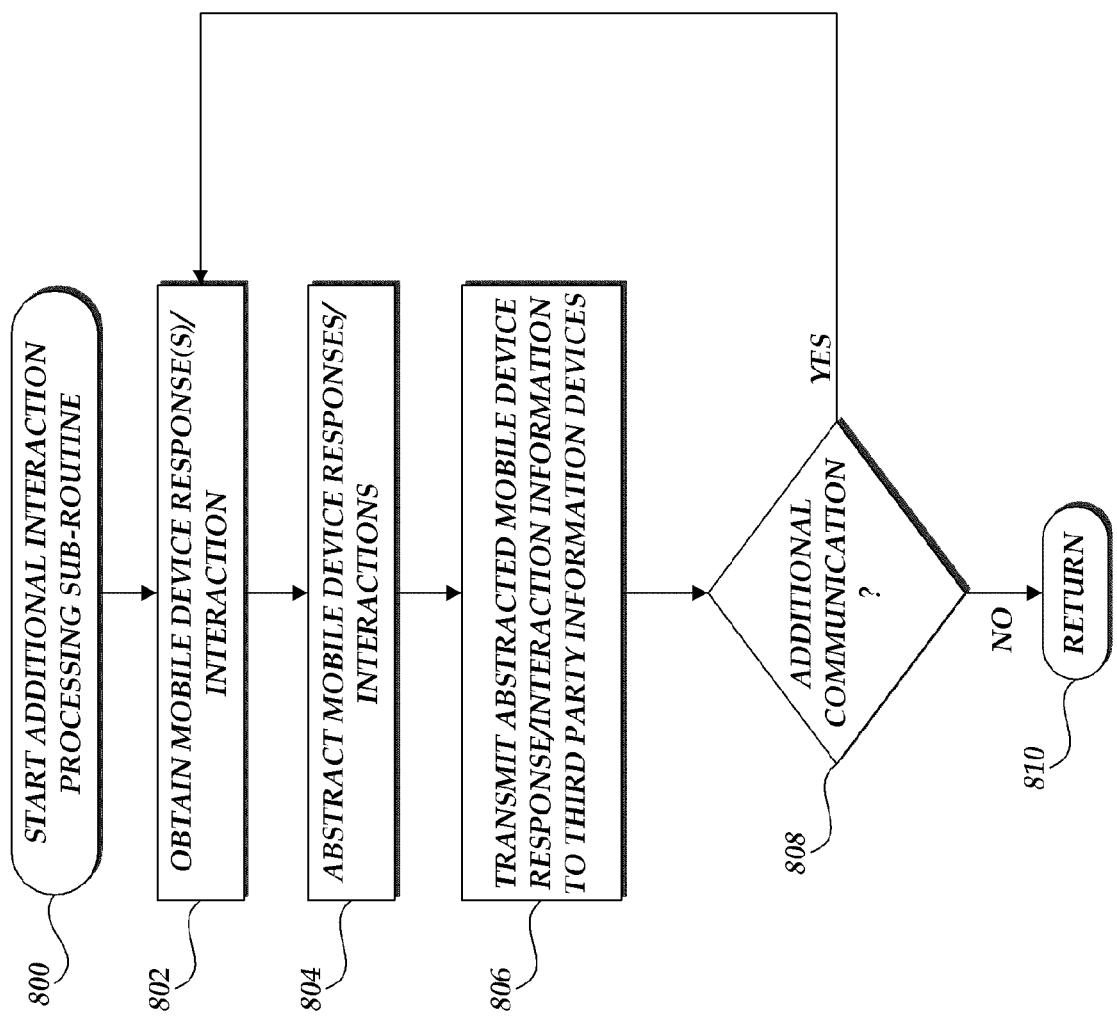

DISSEMINATING TARGETED LOCATION-BASED CONTENT TO MOBILE DEVICE USERS

CROSS-REFERENCE TO RELATED APPLICATIONS

This application claims the benefit of U.S. Provisional Application No. 60/974,044, entitled System for Disseminating Targeted Location-Based Content To Mobile Device Users While Maintaining User Privacy, filed Sep. 20, 2007, the entirety of which is incorporated herein by reference.

BACKGROUND OF THE INVENTION

The advent of location aware (GPS enabled) and internet data enabled mobile phones and electronic communication devices has enabled a variety of location aware and information provisioning services. The combination of available technology and an exploding advertising industry that is undergoing a rapid change from traditional print and advertising TV media to internet data advertising placement has fuelled the growth of companies. The current advertising and marketing paradigm is shifting from delivering advertisements and other information from computer screens to that of mobile phones and other mobile devices.

Early services are simply attempting to enable agencies to directly target or push unsolicited advertisements, coupons, offers or information to mobile phone users. These services are also exploiting GPS and other location aware technologies to reach specific cell phone and communication device users who may be geographically located in a particular region of interest. This class of service is notionally known as a location based advertising service.

The emergence of these services has substantially impacted users' privacy because the advertising agency has often learned much about the subscribers current and past behaviors in addition to their identities. Loss of digital identity is a very important issue and one that is rapidly gaining attention and becoming understood as more cases of identity theft and identity abuse are becoming apparent. Mobile phones, internet email accounts, location based services, and a plethora of instant messaging systems commonly permit end service agencies the ability to extract, record and exploit users' digital identities and private information.

SUMMARY

Consequently, a technological solution is needed that arbitrates the desire of an advertising agency or other third party information source to deliver information unsolicited to a specific subset of mobile device users. This subset of mobile device users may be selected based, e.g., on monitored user behavior, time, location, and/or personal interests, while mitigating, or controlling, the advertiser to access or retrieve user specific identity information. By the same token, the communication users may desire to exploit or trade their personal information for an increasingly rich reward or payment that may be provisioned by discount, coupons or offers.

In accordance with an aspect of the present disclosure, a trusted third party information arbiter that safeguards the digital identities of mobile device users while enabling third party information sources, such as advertisers or data processing services, to accurately target communications to such mobile device users. Illustratively, the mobile device users can control target communications through the utilization of discretion requests/permissions processed by the third party information arbiter. Furthermore, the mobile device users may further interact with the trusted third party information arbiter to provide/release additional personal information. For example, a mobile device user may be provided an increasingly rich rewards or payments that may be provisioned by discount, coupons or offers associated with existing or new product advertisements or promotional information messages.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3A-3C are block diagrams of the communication management system of FIG. 1 illustrating the transmission of mobile device context information by a mobile device and the processing by the communication management system of communication channel initiation requests submitted by a third party communication device;

FIGS. 4A-4C are block diagrams of the communication management system of FIG. 1 illustrating the transmission of mobile device context information by a mobile device and the processing by the communication management system of communication channel initiation requests submitted by the mobile device;

FIGS. 5A-5C are block diagrams of the communication management system of FIG. 1 illustrating the processing by the abstraction information processing component of queries and demographic actions/requests submitted by third party information devices;

FIG. 7 is a flow diagram illustrative of an abstracted information processing routine implemented by an abstraction information processing component to process third party information device communications; and FIG. 8 is a flow diagram illustrative of an abstracted information processing sub-routine implemented by an abstraction information processing component for processing additional third party information device communications.

DETAILED DESCRIPTION OF THE PREFERRED EMBODIMENT

Figure 1:
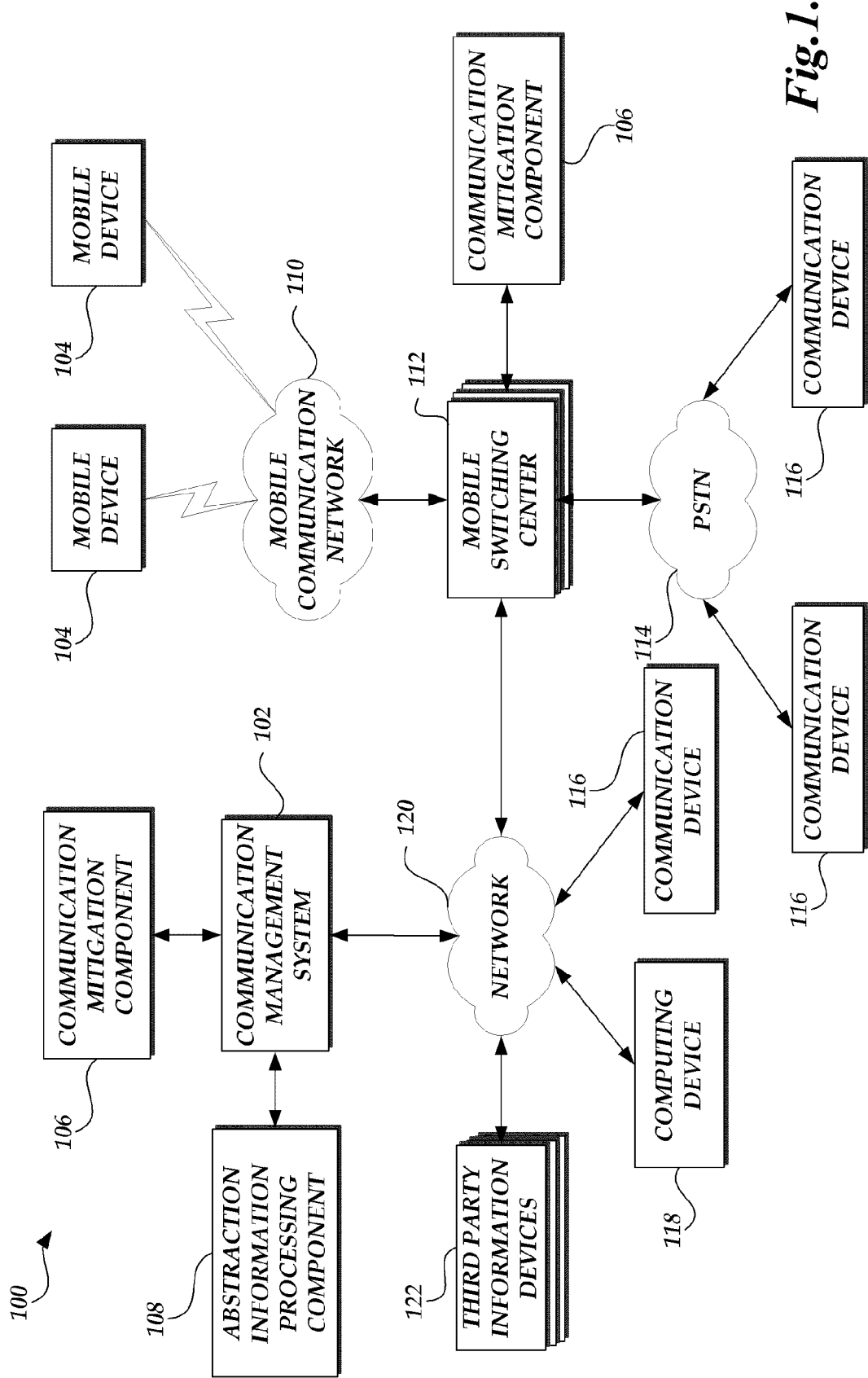
FIG. 1 is a block diagram illustrative of one embodiment of a communication management environment including a communication management system, an abstraction information processing component, a number of mobile devices, and a number of third party information sources.

A system will now be described that embodies various inventive features related to the management of communications between mobile communications devices and third party information sources. As will be recognized, many of these features can be used independently of others, and represent distinct inventions. Further, many of the features can be implemented differently than described herein. Thus, nothing in this detailed description implies that any particular feature, component, process step, characteristic, of combination of the foregoing is essential.

Generally described, embodiments of the present invention correspond to systems, methods and interfaces for the management of communications with a mobile device. Specifically, aspects of the present invention relate to the management of communications provided to mobile device users through the utilization of mobile device profiles, mobile device context information, and/or caller identification information to manage communications.

In accordance with a first aspect, the mobile devices continuously collect, or otherwise obtain, various inputs corresponding to a mobile device environment. The mobile device processes some or all of the inputs with a context assessment algorithm to generate mobile device context information. The mobile device transmits the context information to a communication management system through a variety of communication methods/channels. The mobile device can limit the transmission of context information to the communication management system such that context information is transmitted upon determination of a change in a previous mobile device context. Additionally, the mobile device continues to transmit updated context information or updates to context information throughout various modes of operation, including during an established communication.

The communication management system utilizes the mobile device context information to determine communication device availability by processing the context information with a mobile device profile. The mobile device profiles can specify what communication channels are available for particular mobile device contexts. Additionally, the mobile communication device profiles can be a function of identification information, such as caller ID. Still further, the communication device profiles can specify communication channel mitigation options that can include a suggestion of alternative communication channels or other messages, the presenting of interactive response systems, and/or the initiation of actions in the event the mobile device is not available to maintain a requested communication channel or an existing communication channel.

For subsequent communication requests initiated by the user of the mobile device and/or a third party, the communication management system processes the request according to the prior determined communication availability selected as a function of appropriate selection information, such as the caller ID of the third party. Additionally, in the event of a change of a mobile device context during a previously established communication channel that changes communication availability, the communication management system can implement specified communication channel mitigation actions, which can include the modification or termination of the existing communication channel.

In accordance with another aspect, the above described communication management system is always aware of the remote end user's current context and is always notified of a change of user context as it occurs. Mobile device users can enrich their communications by allowing their at least an abstracted version of his or her current context to be reported to third party information devices via an abstraction information processing component. The abstraction information processing component allows external third party agencies such as advertising agencies, major corporations, health and safety/emergency organizations, etc. to reach target audiences with specific communication messages but without access to the remote user's specific digital identity information. Furthermore, the remote end users can preferably be reached if and only if they have a-priori given permission for specific classes of agency to reach them.

Although aspects of the system will be described to the drawings, flow diagrams, screen interfaces, and specific examples, one skilled in the relevant art will appreciate that the disclosed embodiments are illustrative in nature. Accordingly, the disclosed embodiments should not be construed as limiting.

Communication Management Environment

The present disclosure may be implemented in conjunction with a system that monitors the real time locations and contexts of mobile device users. Once example of such a system is described in U.S. patent application Ser. No. 12/040,832, filed on Feb. 29, 2008 and entitled MANAGEMENT OF MOBILE DEVICE COMMUNICATIONS SESSIONS TO REDUCE USER DISTRACTION, which is hereby incorporated by reference. Accordingly, although an illustrative communication management environment will be described herein, one skilled in the relevant art will appreciate that the operation of a communication management system may include additional or alternative components/interaction. Thus, the described communication management system is illustrative in nature and should not be construed as limiting.

With reference now to FIG. 1, a block diagram illustrative of a communication management environment 100 for managing mobile device communications will be described. As illustrated in FIG. 1, the communication management environment 100 includes a communication management system 102 for processing requests for establishing a communication channel between a supported mobile device and a third party communication device. The communication management system 102 maintains mobile device profiles that are provisioned to establish the availability for the mobile device to establish a communication channel as a function of mobile device context information. The communication device profiles may also be provisioned as a function of identification information of an applicable third party. As will also be described in greater detail below, the communication management system 102 determines the availability of the mobile device to establish a communication channel asynchronously to any request to establish a communication channel.

To manage requested communications or previously established communication channels, the communication management system 102 communicates with corresponding subsystems responsible for establishing the wireless communication channel, such as mobile switching center 112, and utilizes the predetermined availability information and appropriate identification information to allow/reject communications. The communication management system 102 can communicate with the mobile switching center 112 via a direct communication connection, a secure communication channel via a communication network, such as communication network 120, or via a public communication network.

Additionally, the communication management system 102 provides communication channel mitigation options in the event that the mobile device is unavailable, which can include interfacing with a communication mitigation components 106, such as a voice mail system or an interactive voice response system. The communication mitigation component 106 may be directly associated with the communication management system 102. Alternatively, the communication mitigation component 106 may be provided, or otherwise associated with another service provider, such as mobile service provider. Still further, the communication management system 102 facilitates the generation of various graphical user interfaces for provisioning and/or managing mobile device profiles via computing devices.

With continued reference to FIG. 1, the communication management environment 100 can include a number of mobile devices 104. The mobile devices 104 can correspond to wide variety of devices or components that are capable of initiating, receiving or facilitating communications over a communication network including, but not limited to, personal computing devices, hand-held computing devices, integrated components for inclusion in computing devices, home electronics, appliances, vehicles, and/or machinery, mobile telephones, modems, personal digital assistants, laptop computers, gaming devices, and the like. In an illustrative embodiment, the mobile devices 104 include a wide variety of software and hardware components for establishing communications over one or more communication networks, including wireless or wired mobile communication networks 110. The mobile devices 104 can be associated with one or more users for managing communication channel requests and existing communication channels according mobile device contexts.

The mobile device contexts can identify or describe aspects of the mobile device 104, aspects of the mobile device environment, and/or aspects of the user associated with the mobile device. For example, the mobile device context corresponds to a determination of various states of movement/travel, such as in a non-transitory state, an in-transit state (including city/urban travel transit, highway transit, and in-flight transit states), a journey onset state, and a journey termination state. In another example, the mobile device context corresponds a determination of whether a mobile device's present location is within a geospatial boundary, also referred to as geofencing, (including within the geospatial boundary, on a border of the geospatial boundary, or outside the geospatial boundary). One skilled in the relevant art will appreciate that the identified mobile device contexts are not exhaustive and that any number of additional mobile device contexts, or variations of the identified mobile device contexts, may also be defined for the mobile device 104.

An illustrative communication management environment 100 can include a number of additional components, systems and/or subsystems for facilitating communications with the mobile devices 104 and/or the communication management system 102. The additional components can include one or more mobile switching centers 112 for establishing communications with the mobile devices 104 via the mobile communication network 110, such as a cellular radio access network, a wireless network based on the family of IEEE 802.11 technical standards ("WiFi"), a wireless network based on IEEE 802.16 standards ("WiMax), and other wireless networks. The operation of mobile communication networks, such as mobile communication network 110 are well known and will not be described in greater detail.

The communication management system 102 is also in communication with an abstraction information processing component 108. In an illustrative embodiment, the abstraction information processing component 108 obtains mobile device user information that will be used to provide abstracted mobile device user information to one or more third party information devices 122. The mobile device user information can correspond to static user information, such as demographic information, as well as dynamic information associated with a particular mobile device user context (e.g., current location, current velocity, etc.). The abstraction information processing component 108 can also maintain/integrate geographic information associated particular mobile device 104 with known geographic location (e.g., shops and restaurants nearby a current user location). Illustratively, the third party information devices 122 can correspond to advertisers, search engines, data processing services, that request user information and provide customized content, such as advertisements, promotions, coupons, etc. The third party information devices 122 can correspond to computing devices, web services, etc. that correspond to such entities. Accordingly, reference to third party information devices 122 relates to either the computing devices or computing services and/or entities associated with the computing devices or computing services depending on the context.

As further illustrated in FIG. 1, the mobile switch center 112 includes interfaces for establishing various communications with via the communication network 120, such as the Internet, intranets, private networks and point-to-point networks. In one example, the mobile switch center 108 can include interfaces for establishing communication channels with various communication devices 112, such as landline telephones, via a public switched telephone network (PSTN) 114. The mobile switch center 112 can include interfaces for establishing communication channels with various communication network-based communication devices 116, such as a VoIP communication device. Still further, the mobile switch center 112 can include interfaces for establishing communication channels with a mobile-based communication device, such as another mobile device. For example, the communication devices can correspond to a third-party mobile communication that establishes an audio communication channel with a mobile device 104. Accordingly, although communication network 110 is illustrated as a single communication network, one skilled in the relevant art will appreciate that the communication network can be made up of any number of public or private communication networks and/or network connections.

The various communication devices 116 can include the hardware and software components that facilitate the various modes of operation and communication, such as via wired and wireless communication networks. Additionally, the computing devices 116 can include various hardware and software components, such as a browser software application, that facilitate the generation of the graphical user interfaces for provisioning and managing mobile device profiles as will be described below.

One skilled in the relevant art will appreciate that the components and configurations provided in FIG. 1 are illustrative in nature. Accordingly, additional or alternative components and/or configurations, especially regarding the additional components, systems and subsystems for facilitating communications may be utilized.

Figure 2:
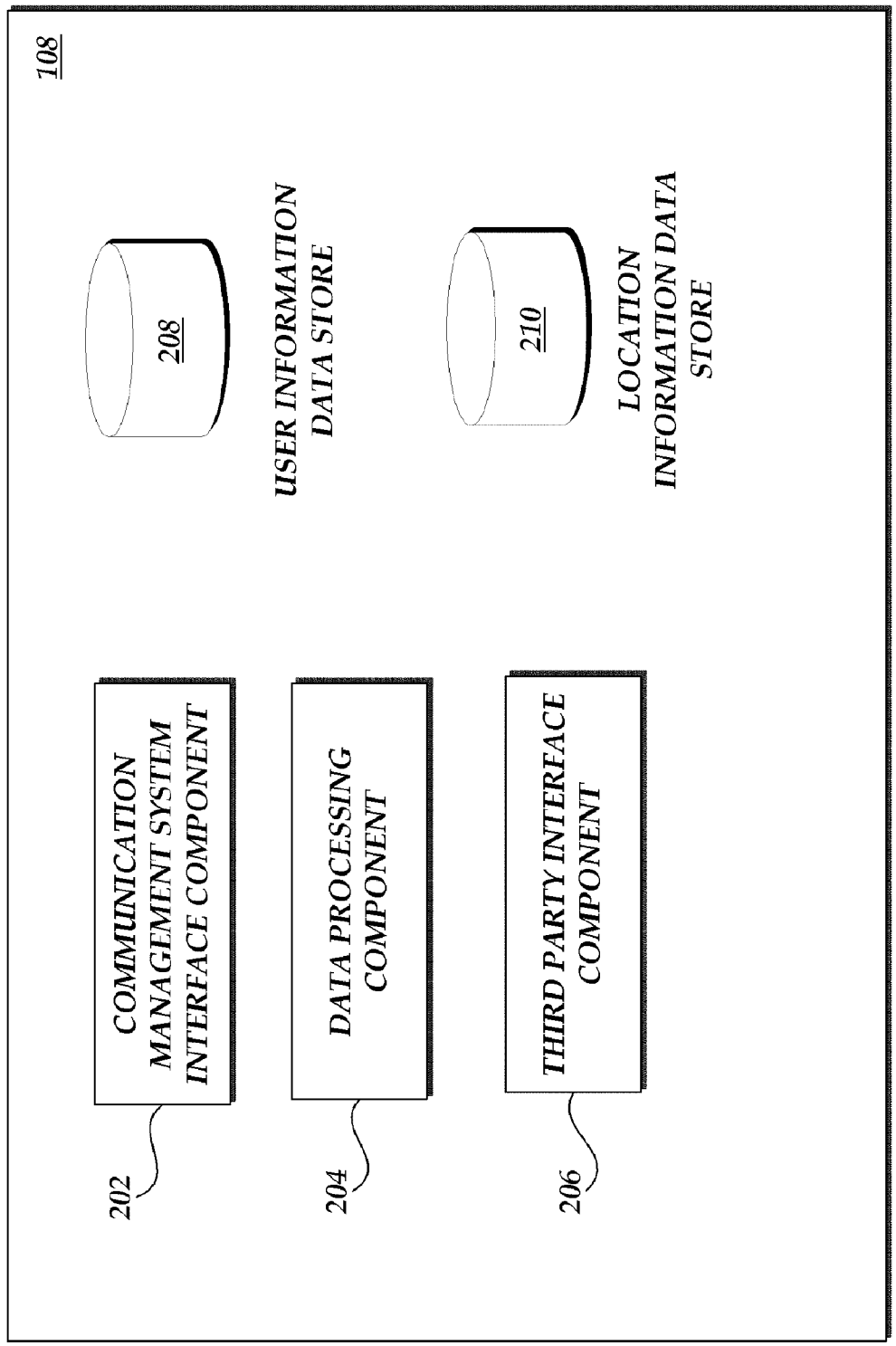
FIG. 2 is a block diagram illustrative of aspects of an abstraction information processing component in an embodiment of the communication management environment of FIG. 1.

With reference now to FIG. 2, illustrative components of the abstraction information processing component 108 will be described. Although the operation of the various functions associated with the abstraction information processing component 108 will be described with regard to below subcomponents, one skilled in the relevant art will appreciate that the subcomponents are illustrative in nature. Accordingly, an abstraction information processing component 108 may include additional components or alternative components to facilitate one or more functions. Additionally, although the various subcomponents are illustrated as integrated into an abstraction information processing component 108, one or more of the components may be implemented in a distributed manner over a communication network and/or be implemented as a network service, e.g., a Web service.

As illustrated in FIG. 2, the abstraction information processing component 108 includes a communication management system interface component 202 for establishing communications with a mobile device 104 via the communication management system 102. In an illustrative embodiment, the communication management system interface component 202 corresponds to a component for facilitating the bi-lateral transfer of data, such as mobile device context information, context assessment algorithms, etc., between the mobile device 104 and the abstraction information processing component 108. The communication management system interface component 202 can include software and hardware components necessary to establish one or more communication channels corresponding to various communication protocols such as Bluetooth, the family of IEEE 802.11 technical standards ("WiFi"), the IEEE 802.16 standards ("WiMax"), short message service ("SMS"), voice over IP ("VoIP") as well as various generation cellular air interface protocols (including, but not limited to, air interface protocols based on CDMA, TDMA, GSM, WCDMA, CDMA2000, TD-SCDMA, WTDMA, LTE, OFDMA and similar technologies).

The abstraction information processing component 108 can also include a data processing component 204 for obtaining and processing search queries from third party information devices 122. The data processing component 204 can execute various processes or algorithms for processing specific mobile device context information and generated a set of abstracted information response to the third party information devices 122. Additionally, the data processing component 204 can also manage mobile device user information associated with the mobile devices 104 and location information maintained in either the user information data store 208 and/or the location information data store 210. The location information in the location information data store 210 may be GIS map information and can identify relevant structures in a given region (e.g., coffee shop locations, road and highway speed limits, public transport stations etc) according to traditional map information such contours and grid references. One skilled in the relevant art will appreciate that the user information data store 208 and the location information data store 210 may correspond to one or more database, files, etc. Additionally, the user information data store 208 and/or the location information data store 210 may be maintained locally to the abstraction information processing component 108 or distributed via the communication network 120.

With continued reference to FIG. 2, the abstraction information processing component 108 can include a third party interface component 206 for communicating with various third party information devices 122. As previously discussed, the third party information devices 122 transmit search queries to the abstraction information processing component 108 via the third party interface component 206. Abstracted search results generated by the data processing component 204 can returned to the third party information devices 122 via the third party interface component 206. Additional, interactions, such as the exchange between the third party information devices 122 and the abstraction information processing component 108 can be facilitated by the third party interface component 206.

With reference now to FIGS. 3-4, the interaction between various components of the communication management environment 100 of FIG. 1 will be illustrated. For purposes of the example, however, the illustration has been simplified such that many of the systems, subsystems, and components utilized to facilitate communications are not shown. One skilled in the relevant art will appreciate that such components or subcomponents can be utilized and that additional interactions would accordingly occur without departing from the spirit and scope of the present invention.

With reference now to FIGS. 3A-3C, one embodiment related to the processing of a request from a third party communication device 116 to establish a communication channel, such as an audio call, will be described. For purposes of the illustrative example, a particular mobile computing device 104 has registered with a communication management service that provides the communication management system 102. Additionally, a user of the mobile device 104 has provisioned a mobile device profile that identifies the availability of the mobile device as a function of mobile device contexts and third party identification information. Alternatively, some portion the mobile device profile may be pre-provisioned for the user and/or automatically set by an administrator, such as a service provider.

As illustrated in FIG. 3A, during the operation of the mobile device 104, or during an initialization of the mobile device, the mobile device 104 obtains a set of inputs corresponding to the mobile device environment. The set of inputs are processed by the mobile device 104 to generate mobile device context information. The mobile device 104 then transmits the mobile device context information to the communication management system 102 as appropriate. Specifically, to reduce power consumption and/or bandwidth consumption, the mobile device 104 may limit the transmission of mobile device context information for the initialization of a mobile device context, a detection of a change in mobile device context and/or for the re-establishment of a mobile device context.

Upon receipt of the context information, the communication management system 102 obtains a corresponding, or applicable, mobile device profiles from a profile data store 210. The communication management system 102 may utilize one or more mobile device profiles to determine mobile device availability from the context information. Alternatively, a single mobile device profile may define availability for multiple mobile device contexts. The communication management system 102 then determines the availability of the mobile device to establish a communication channel (either receipt of a request or the initiation of a request) based on the processing.

Thereafter, in the illustrative example of FIG. 3A, a communication device 116, such as a third party communication device initiates a request to establish a communication channel with the mobile device 104. The request is received by the mobile switching center 112 and is held pending an approval or rejection by the communication management system 102. The applicable mobile switching center 112 then transmits the request to the communication management system 102 to request a determination whether the requested communication channel should be established. The request can include additional information utilized by the communication management system 102 to select an appropriate profile, including caller identification information and the like.

With reference now to FIG. 3B, upon receipt of the request or notification from the mobile switching center 112, the communication management system 102 utilizes the predetermined availability of the mobile device 104 to authorize or reject the establishment of the requested communication channel. If the request to initiate the communication channel is authorized, the authorization is transmitted to the mobile switching center 112, which processes the request for initiation of the communication channel in an appropriate manner. Accordingly, the requested communication channel is completed. The communication management system 102 may continue to monitor the established communication channel for a change in mobile device context and will manage the communication channel as defined in the applicable mobile device profile.

With reference now to FIG. 3C, alternatively, if the request for initiation of the communication channel is rejected based on a predetermined unavailability of the mobile device 104, the communication management system 102 transmits a rejection authorization communication to the mobile switching center 112 to prevent the initiation of the communication channel. Additionally, the communication mitigation component 106 can provide appropriate communication mitigation, such as notifications to the users of the mobile device 104 and the communication device 116. Additionally, the communication management system 102 can obtain a selection of a communication channel alternative defined in the mobile device profile, such as voicemail systems or interactive voice response systems, as will be described in greater detail below.

Figure 4A:
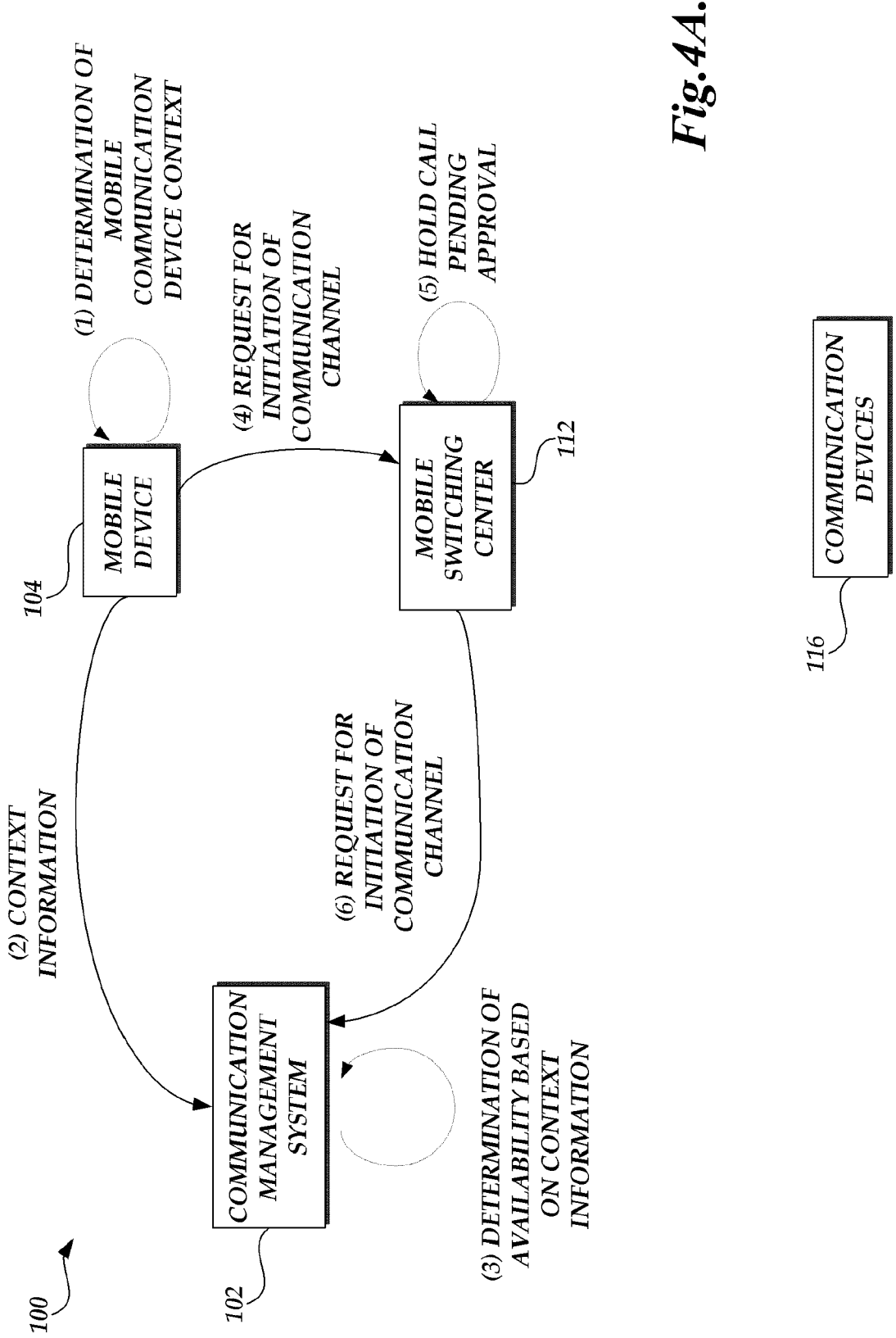
Figure 4B:
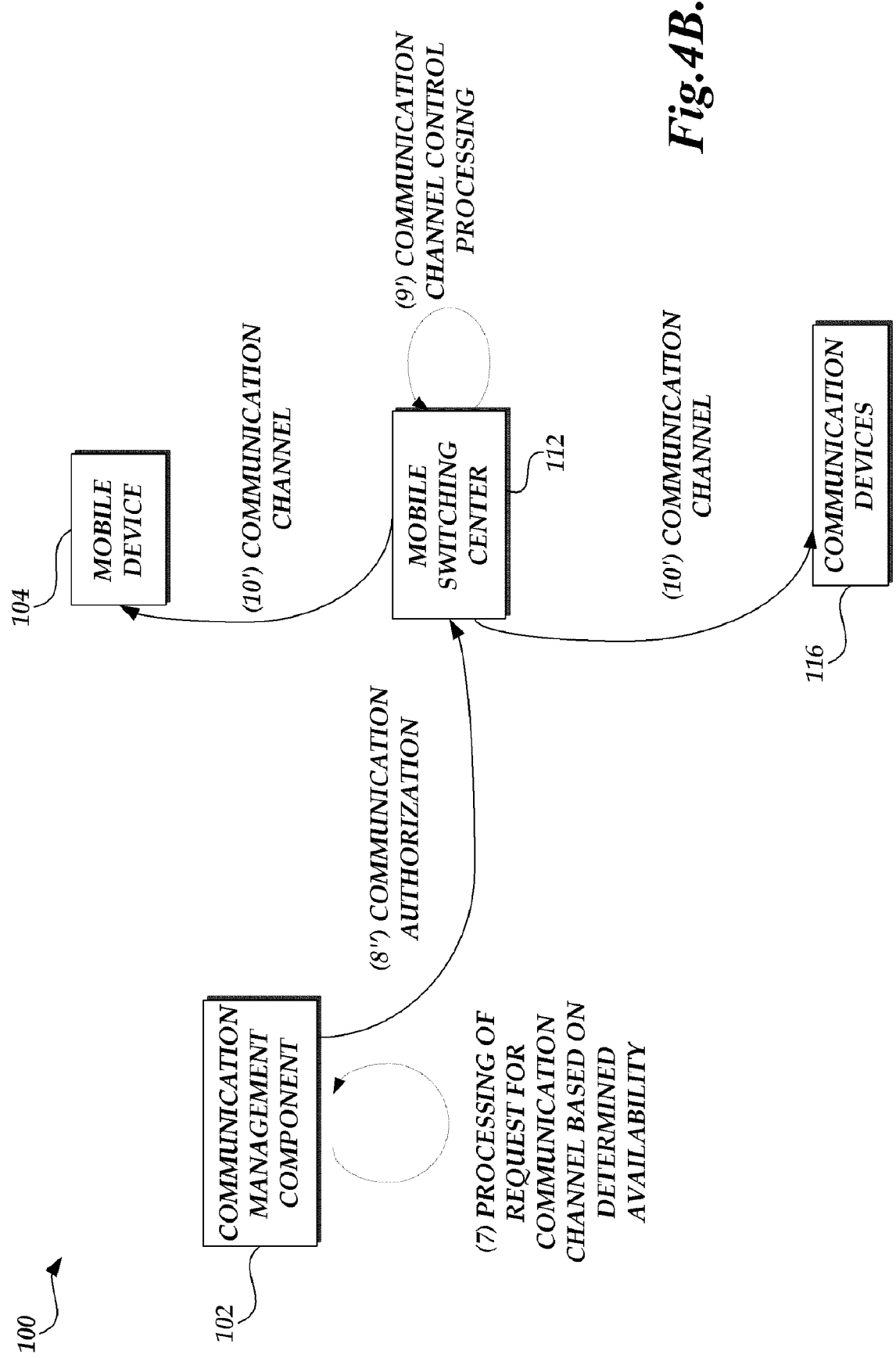

With reference now to FIGS. 4A-4C, one embodiment processing of a request from a user at a mobile device 104 to establish a communication channel, such as an audio call, with a third party communication device 116 will be described. As described above with regard to FIGS. 3A and 3B, for the illustrative example, it is assumed that a particular mobile device 104 has registered with a communication management service that provides the communication management system 102 and provisioned a mobile device profile that identifies the availability of the mobile device for particular mobile device contexts.

As illustrated in FIG. 4A, during the operation of the mobile device 104, or during an initialization of the mobile device, the mobile device 104 obtains a set of inputs corresponding to the mobile device environment. The set of inputs are processed by the mobile device 104 to generate mobile device context information. The mobile device 104 then transmits the mobile device context information to the communication management system 102 as appropriate. Specifically, to reduce power consumption and/or bandwidth consumption, the mobile device 104 may limit the transmission of mobile device context information for the initialization of a mobile device context, a detection of a change in mobile device context and/or for the re-establishment of a mobile device context.

Upon receipt of the context information, the communication management system 102 obtains one or more corresponding, or applicable, mobile device profiles from a mobile device profile data store. The communication management system 102 then determines the availability of the mobile device to establish a communication channel (either receipt of a request or the initiation of a request) based on the processing.

Thereafter, in the illustrative example of FIG. 4A, the mobile device 104 initiates a request to establish a communication channel with a communication device 116, such as a third party communication device. The request is received by the mobile switching center 112 and is held pending an approval or rejection by the communication management system 102. The applicable mobile switching center 112 then transmits the request to the communication management system 102, along with additional information, such as the identification information (e.g., telephone number) of the third party communication device 116.

With reference now to FIG. 4B, upon receipt of the request or notification from the mobile switching center 112, the communication management system 102 obtains applicable communication profiles using the identification information or other information and utilizes the predetermined availability of the mobile device 104 to authorize or reject the establishment of the communication channel. If the request to initiate the communication channel is authorized, the authorization is transmitted to the mobile switching center 112, which processes the request for initiation of the communication channel in a typical manner. Accordingly, the requested communication channel is completed. The communication management system 102 may continue to monitor the established communication channel for a change in mobile device context.

With reference now to FIG. 4C, alternatively, if the request for initiation of the communication channel is rejected based on a determined unavailability of the mobile device 104, the communication management system 102 transmits a rejection authorization communication to the mobile switching center 108 to prevent the initiation of the communication channel. Additionally, the communication management system 102 can provide appropriate notifications to the users of the mobile device 104 and the communication device 116. Additionally, the communication management system 102 can obtain a selection of a communication channel alternative via the communication mitigation component 106 (FIG. 1).

Abstracted Information Processing Embodiment

Figure 5B:
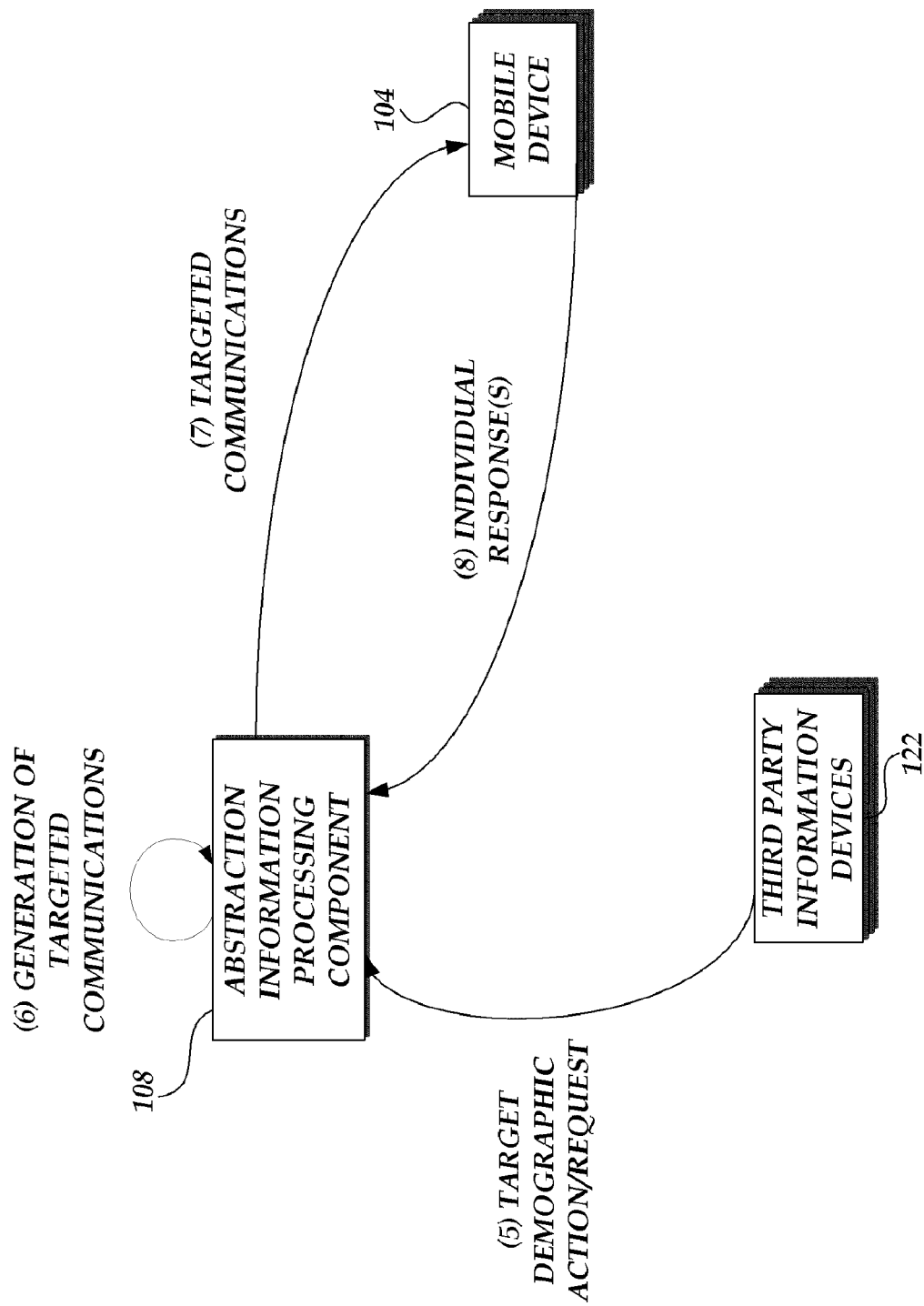
Figure 6:
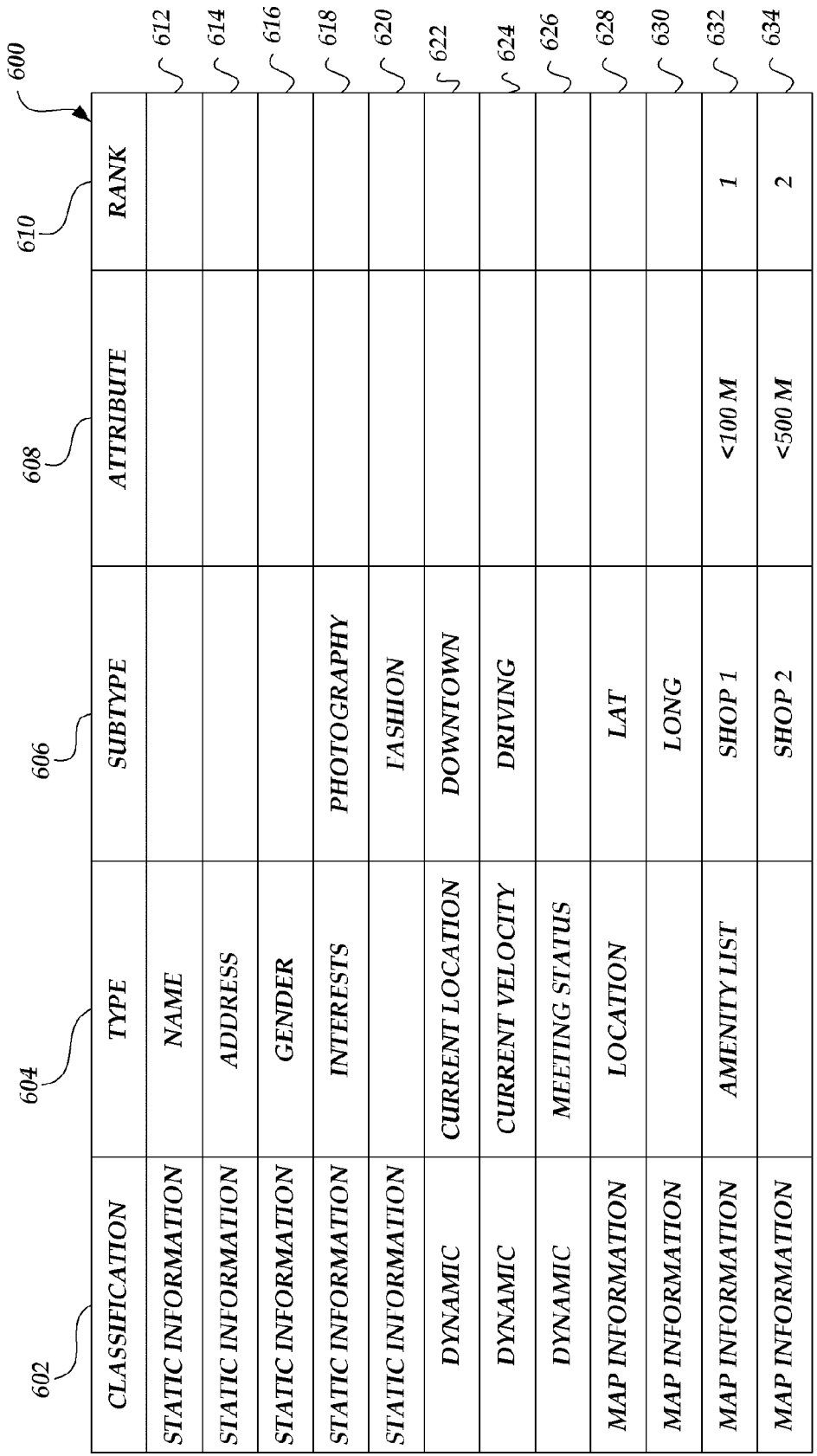
FIG. 6 is a block diagram illustrative of a mobile device user data store utilized by an abstraction information processing component to process third party information device communications.

With reference now to FIGS. 5-6, one embodiment related to the processing of a request from a third party information device 122 to facilitate the generation of targeted de demographic communications to mobile devices 104, will be described. For purposes of the illustrative example, a set of mobile devices 104 have registered with a communication management service that provides the communication management system 102. Additionally, each user associated with the mobile device 104 has provisioned a mobile device profile that identifies the availability of the mobile device as a function of mobile device contexts and third party identification information. Additionally, the user may have provided additional profile information, such as demographic information and profile information. Alternatively, some portion the mobile device profile may be pre-provisioned for the user and/or automatically set by an administrator, such as a service provider.

With reference to FIG. 5A, assuming that the abstraction information processing component 108 has previously compiled, or been provided access to, relevant information in the user information data store 208 and/or location information data store 210, the abstraction information processing component 108 obtains a query from one or more third party information devices 122. Illustratively, the queries from the third party information devices 122 can correspond to information to define a subset of mobile device 104 that can be targeted for subsequent, targeted demographic communications. The data processing component 204 in turn queries the user information data store 208 and computes a response that mitigates the user specific personal information via abstracted query results. The abstracted query results are provided to the third party information devices 122 in a manner that will facilitate submission of targeted, demographic communications to mobile devices 104. The abstracted responses may also be associated with time expiration data, such as a time stamp and an expected expiration time. Illustratively, the expiration can be sent in the form of a notification to the third party information device 122 when 10% and 25% of the original remote user's context has changed. This indicates to the third party information device 122 the rate at which the original enquiries value is diminishing and permits the judgment by when supplementary or additional enquiries can be made By way of an exemplary example;
Enquiry: How many teenagers are within 100 metres of a Starbucks coffee shop?
Abstracted Response: 250 eighteen to fourteen males 369 eighteen to fourteen females are within 50 metres of a Starbucks coffee shop. 67% of this population has opted in for coupon and advertising communications from Starbucks Turning to FIG. 5B, based on the abstracted query results, the third party information devices 122 submit to the abstraction information processing component 108 targeted demographic actions/requests that will be directed to specific mobile devices 104 by the abstraction information processing component 108 (via the communication management system 102). The third party information device requests will typically not be directed to identifiable mobile devices 104, since such identification information was not previously provided by the abstraction information processing component 108. The targeted demographic actions/requests can correspond to advertisements, coupons, discount offers, information requests, surveys, and the like. The targeted demographic actions/requests may be in the form of notifications to receive communications or broadcast of the actual electronic communications (e.g., electronic mail messages, short message service (SMS) messages, instant message messages, micro-Web logs, and other types of communications. Additionally, the targeted demographic actions/requests may also be in the form of Web pages or other forms of customized content accessible by the mobile devices 104 (directly via the mobile device or via another computing device).

Upon receipt of the targeted demographic actions/requests, the mobile devices 104 can examine the targeted actions/request, such as by accessing a customized Web page. The mobile device 104 can provide individual responses to the abstraction information processing component 108 corresponding to confirmation that the targeted demographic action/request has been accessed and/or any additional instructions/requests. By way of an example, the mobile device 104 may receive an actionable SMS and text message that encodes all the human response requirements into a single actionable task upon the mobile device. This then launches a web browser that links directly to a hosted Web page provided by the abstraction information processing component 108. This event can be logged and offered as a value added feedback to the third party information devices 122. As described previously, all user specific information can be stripped from the interaction information such that only summaries of information transactions are issued.

With reference now to FIG. 5C, the abstraction information processing component 108 again processes the information (as described above) and provides abstracted responses to the abstracted demographic responses to the third party information devices 122. Thereafter, the abstraction information processing component 108, mobile devices 104 and/or third party information devices 122 can interact further. For example, if a mobile device wishes to act further upon the availability of an offer, additional user interaction permits the delivery of an SMS or text email to occur in which the redemption coupon is then delivered to the handset. The delivered e-vouchers, e-coupons or e-offer validation codes are unique and may consist of single use, multi-use, time limited (minutes to years) or shareable in which other individuals may be invited to utilize the same product code. Indeed users who share or evangelize a particular product will be eligible for additional rewards as a function of their sharing activity. The vouchers may consist of a simple alpha numeric sequence or a visual display in which a standard one or two dimensional barcode is utilized. Additionally, the time frame between the creation of the offer and the response behaviors can be accurately measured and reported. Thus an exemplary transaction sequence may be reported to the third party as described below:

Enquiry: How many teenagers are within 100 meters of a Starbucks coffee shop?
Abstracted Response: 250 eighteen to fourteen males 369 eighteen to fourteen females are within 50 metres of a Starbucks coffee shop. 67% of this population has opted in for coupon and advertising communications from Starbucks
Abstract Request Communicate the availability of a coupon codes for a free coffee to all eligible eighteen to fourteen females that are within 50 metres of a Starbucks coffee shop
Abstracted Response After 2 minutes 20 women had examined the advert, 0 had exercised
After 5 minutes 100 women had examined the advert, 3 had exercised
After 20 minutes 200 women had examined the advert, 30 had exercised In an illustrative embodiment, the communication sequence between the abstraction information processing component 108 and the third party information devices 111 may be completely automated, such that no human intervention is required. For example, a third party information device 122 may be programmed to automatically send enquiries or queries, and to determine, based on the abstracted response, whether to proceed with the broadcast of an offer to the target group. The third party information device 122 may also be programmed to select an appropriate offer based on the abstracted response.

With reference now to FIG. 6, an illustrative data table 600 maintained by the abstraction information processing component 108 in the user information data store 208 for processing third party information device search queries will be described. The data table includes a number of columns 602, 604, 6060, 608 and 601 for maintaining attributes about specific mobile devices 104. Specifically, column 602 defines whether the information corresponds to static information about a mobile device user that does not change frequently, dynamic information that will likely frequently change and can become stale, or third party information associated with the user (such as map information). Column 604 defines specific types of the above identified classification information, while column 606 defines subtypes for each of the defined types. Column 608 defines attributes of the specific instance of the type/subtype and can also be used for tracking mobile device interaction information (e.g., when did the mobile device access the information). Finally, column 610 defines rank information that can be used to prioritize information within each classification or within the entire table 600. The type of information maintained in each of the columns may be predefined by the abstraction information processing component 108. Alternatively, the information may not be limited and may correspond to any information provided by the mobile device 104, or otherwise obtained by the abstraction information processing component 108.

With reference to an illustrative example within FIG. 6, rows 612-620 correspond to static information associated with a particular user, namely, "NAME," "ADDRESS," "GENDER," and "INTERESTS." Rows 618 and 620 further define two subtypes of "INTERESTS," namely, "PHOTOGRAPHY" and "FASHION." Rows 622-626 correspond to dynamic information, which is typically determined by the mobile device 104 and communicated to the communication management system 102. The dynamic information illustrated in FIG. 6 includes "CURRENT LOCATION," "CURRENT VELOCITY," and MEETING STATUS." Finally, rows 628-634 correspond to map information obtained by the abstraction information processing component 108 and associated with the particular mobile device. The map information corresponds to "LOCATION" information including a "LAT" and "LONG" subtype. The map information also corresponds to geographic information associated with the location information such as the identification of recognizable landmarks/areas of interests based on the known location (e.g., "SHOP 1" and "SHOP 2"). In this example, row 632 has a higher priority ranking than row 634, likely due to the closer proximity to the mobile device 104 as captured in the "ATTRIBUTE" column 608.

One skilled in the relevant art will appreciate that table 600 may include a number of additional columns and/or rows for capturing mobile device data used to process queries from third party information devices 122. Moreover, the abstraction information processing component 108 may maintain multiple tables for different third party information devices 122 or for different purposes (e.g., advertisements vs. coupons). Further, the information provided in table 600 is illustrative and is not limiting as to the type of information that can be stored in table 600. Finally, one skilled in the relevant art will appreciate that any number of data structures/methodologies may be used to track mobile device information.

With reference now to FIG. 7, a routine 700 implemented by the abstraction information processing component 108 to process search queries and generate abstracted information request will be described. At block 702, the abstraction information processing component 108 obtains third party information source queries from third party information devices 122. The queries may be in the form specified by the abstraction information processing component 108, such as via an application programming interface (API) or via a Web page form accessed via computing device and communication network. At block 704, the abstraction information processing component 108 processes the queries according to the information in the user information data store 208. In an illustrative embodiment, the abstraction information processing component 108 may process the queries, such as by parsing the query and/or translating information, to identify the relevant fields that will be queried.

At block 706, the abstraction information processing component 108 obtains the query results and abstracts the query results. Illustratively, the abstraction information processing component 108 can maintain templates of abstracted information and/or conduct keyword searching to remove any client-specific information. At block 708, the abstracted query results are transmitted to the requested third party information device 122.

At block 710, the abstraction information processing component 108 can obtain targeted demographic communications from one or more third party information devices 122. As previously described, the targeted demographic communications can correspond to actions or requests that are targeted to specific mobile devices 104, or classes of mobile devices 104, based on the previously received abstracted search results. For example, an advertisement may be targeted to specific static parameters (e.g., age) as well as dynamic parameters (e.g., downtown near a coffee shop). The targeted communications can corresponds to content for inclusion in electronic messages or via customized Web pages, including, but not limited to, advertisements, coupons, discounts, identification information (e.g., phone numbers or URLs). The targeted communications may be specified for inclusion in a specific targeted communication to the mobile device 104 or as part of a collection/compilation transmitted to the mobile device 104.

At block 712, the targeted communications are transmitted by the abstraction information processing component 108 to one or more mobile devices 104. As previously described, the transmission can correspond to notifications of pending messages, communication of electronic messages and/or communication of customized content. The communications can include content that can be accessed immediately by the mobile device 104 either directly via the communication network or the communication management system 102 (e.g., a URL). The communication can also include content that can be utilized by the mobile device user at a later point, such as a printable bar code or coupon. At block 714, the abstraction information processing component 108 processes any additional communications between the mobile devices 104 and the third party information devices 122. A sub-routine for processing the additional communications will be described with regard to FIG. 8. At block 716, the routine 700 terminates.

Turning now to FIG. 8, a sub-routine 800 implemented by the abstraction information processing component 108 for processing additional communications between the mobile devices 104 and the third party information devices 122 will be described. At block 802, the abstraction information processing component 108 obtains mobile device 104 interaction/response information. As previously described, the abstraction information processing component 108 may generate customized Web pages in which access and activity within the Web pages can be logged. Additionally, the abstraction information processing component 108 may obtain communications from the mobile device 104 in response to accessing the content. For example, the mobile device 104 may issue a confirmation message to ensure that the user is accorded credit.

At block 804, the abstraction information processing component 108 abstracts the user responses/interactions and transmits the responses to the corresponding third party information devices 122. As previously described, the user responses/interactions may be associated with timing information to facilitate knowledge of the receipt of the targeted information and the relative effectiveness of the communication (e.g., how long did it take for mobile devices 104 to access the advertisement).

At decision block 808, the abstraction information processing component 108 determines whether additional communication/interaction is required or available. If so, the sub-routine 800 returns to block 802 to obtain and process the additional interaction. In an illustrative embodiment, success iterations of sub-routine 800 may yield additional benefit (such as points, credits or access to new content). Accordingly, a mobile device 104 may elect to provide additional information and/or spend additional time accessing targeted communications in exchange for additional value. Once no additional interaction is available or desired, the sub-routine 800 returns at block 810.

In one embodiment, the abstraction information processing component 108 may also provide additional services for reconciling credits/charges based on mobile device 104 interaction with the targeted communications. For example, the abstraction information processing component 108 may keep track of all coupons accessed and redeemed such that an appropriate third party information device 122 may be charged for the value provided to the user. In another example, the abstraction information processing component 108 may interact with a credit service, such as a frequent customer service or points based service, that can reconcile mobile device activity and offers provided by the third party information devices 122.

While illustrative embodiments have been disclosed and discussed, one skilled in the relevant art will appreciate that additional or alternative embodiments may be implemented within the spirit and scope of the present invention. Additionally, although many embodiments have been indicated as illustrative, one skilled in the relevant art will appreciate that the illustrative embodiments do not need to be combined or implemented together. As such, some illustrative embodiments do not need to be utilized or implemented in accordance with scope of variations to the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A computer-implemented method implemented by one or more computing devices configured with specific executable instructions, the computer-implemented method comprising:
   maintaining current location data and demographic data of a plurality of mobile device users;
   maintaining, for each of the plurality of mobile device users, permissions that specify amounts of personal information of the mobile device user which may be shared with business entities, wherein the personal information corresponds to at least current location data and demographic data;
   receiving a query specified by a business entity, said query specifying demographic and current location criteria for identifying mobile device users satisfying at least a portion of the received query, wherein the demographic criteria corresponds to an age range, specified gender, or one or more specified interests, and wherein the location criteria corresponds to a distance range from a specified point, or a velocity range;
   responding to the received query by using the current location data and demographic data to identify a subset of said mobile device users that satisfy the specified demographic and current location criteria;
   generating a set of abstracted information based on the identified subset of mobile device users and based on the permissions of each mobile device user, the abstracted information including:
   filtered identities of the subset of mobile device users,
   generalized demographic data matching specified demographic criteria provided by the business entity, the generalized demographic data corresponding to a number of mobile device users that satisfy the specified demographic criteria without revealing demographic data of any individual mobile device user, and
   generalized current location data matching specified current location criteria provided by the business entity, the generalized current location criteria corresponding to a number of mobile device users that satisfy the specified current location criteria without revealing current location data of any individual mobile device user;
   providing the set of abstracted information to the business entity responsive to the received query, the set of abstracted information regarding said subset of mobile device users without revealing identities of said users to the business entity, such that the business entity can determine substantially in real time whether to provide an offer to the subset of users;
   over a specified period of time, repeatedly determining a number of the identified subset of mobile device users whose current location data no longer satisfies the specified current location criteria, and
   if the determined number is above a specified expiration notification number, providing an expiration notification to the business entity, the expiration notification reflecting the determined number of the identified subset of mobile device users whose current location data no longer satisfies the specified current location criteria.

2. The method of claim 1, further comprising, after providing said abstracted information to the business entity, broadcasting an offer supplied by the business entity to the mobile devices of the users such that the broadcast is limited to the subset of users who satisfy the query.

3. The method of claim 1, further comprising tracking responses of the users to said offer substantially in real time, and providing feedback data to the business entity regarding said responses.

4. A computer system configured to perform the method of any of claims 1-3.

5. A non-transitory computer-readable storage medium having stored thereon one or more executable instructions that, when executed by a computing device, embody the method of claim 1.

6. The method of claim 1, wherein the mobile device is a mobile telephone.

7. The method of claim 1, wherein the mobile device is a laptop computer.

8. The method of claim 1, wherein receiving a query specified by a business entity includes receiving a query specifying current location criteria corresponding to a distance from a specified location.

9. The method of claim 1, wherein receiving a query specified by a business entity includes receiving a query including demographic criteria corresponding to at least one of a name criteria, an age criteria, a gender criteria, and an area of interest criteria.

10. The method of claim 1, wherein the amount of current location data which may be shared with third parties and the amount of demographic data which may be shared with third parties are different amounts.

11. A method, implemented by one or more computing devices configured with specific executable instructions, for managing information associated with a mobile device user, the method comprising:

maintaining, for each of the plurality of mobile device users, a set of static information, the set of static information corresponding to information associated with a mobile device user and to information which is not subject to frequent change over a defined period of time;

maintaining, for each of the plurality of mobile device users, a set of dynamic information, the set of dynamic information corresponding to information associated with a mobile device and to information subject to frequent change over the defined period of time;

maintaining, for each of the plurality of mobile device users, a permissions that specify amounts of personal information which may be shared with third parties, wherein the personal information corresponds to at least static information and dynamic information;

receiving a query from an entity, said query specifying dynamic information criteria and static information criteria for identifying mobile device users;

responding to the query by using the maintained sets of static information and the maintained sets of dynamic information to identify a subset of said mobile device users that satisfy the received query;

generating a set of abstracted information based on the identified subset of mobile device users and based on the permissions of each mobile device user, the abstracted information including generalized static information and generalized dynamic information;

providing the abstracted information to the entity without revealing identities of said users to the entity; and over a specified period of time, repeatedly determining a number of the identified subset of mobile device users whose dynamic information no longer satisfies the specified dynamic information criteria, and if the determined number is above a threshold, providing an expiration notification to the entity, the expiration notification reflecting the determined number of the identified subset of mobile device users whose dynamic information no longer satisfies the specified dynamic information criteria.

12. The method of claim 11, further comprising transmitting an offer to the identified subset of mobile device users.

13. The method of claim 12, further comprising tracking responses of the identified subset of mobile device users to the offer and transmitting feedback data regarding said responses.

14. The method of claim 11, wherein the specified dynamic information criteria corresponds to at least one of location criteria, velocity criteria, meeting status criteria, journey state criteria, and availability criteria.

15. The method of claim 11, wherein the amount of static information which may be shared with third parties and the amount of dynamic information which may be shared with third parties are different amounts.

16. A method, by one or more computing devices configured with specific executable instructions, for managing information associated with a mobile device user, the method comprising: maintaining a set of information corresponding to a plurality of mobile device users; maintaining, for each of the plurality of mobile device users, a set of permissions that specify an amount of personal information which may be shared with third parties; receiving a query, said query specifying information criteria for identifying mobile device users; responding to the query by using the maintained set of information to identify a subset of said mobile device users that satisfy the received query; generating a set of abstracted information based on the identified subset of mobile device users and based on the set of permissions of each mobile device user, the abstracted information including generalized information corresponding to each of the mobile device users, the abstracted information satisfying the information criteria specified in the received query; and transmitting the abstracted information, wherein the abstracted information is utilized to selectively transmit content to the mobile device users corresponding to the abstracted information; and over a specified period of time, repeatedly determining a number of the identified subset of mobile device users whose information no longer satisfies the specified information criteria, and if the determined number is above a threshold number, providing an expiration notification, the expiration notification reflecting the determined number of the identified subset of mobile device users whose information no longer satisfies the specified information criteria.

17. The method of claim 16, further comprising transmitting an offer to the identified subset of mobile device users.

18. The method of claim 17, further comprising tracking responses of the identified subset of mobile device users to the offer and transmitting feedback data regarding said responses.

19. The method of claim 16, wherein the specified information criteria corresponds to both real-time status criteria of the mobile device and demographic criteria of the mobile device user.

20. The method of claim 16, wherein the the set of permissions specify amounts of information which may be shared with third parties according to a type of information.

21. The method of claim 20, wherein the types of information include at least real-time mobile device status information and demographic information of the mobile device user.

* * * * *

UNITED STATES PATENT AND TRADEMARK OFFICE
CERTIFICATE OF CORRECTION

PATENT NO. : 8,224,353 B2
APPLICATION NO. : 12/235535
DATED : July 17, 2012
INVENTOR(S) : Andrew S. Wright et al.

Page 1 of 1

It is certified that error appears in the above-identified patent and that said Letters Patent is hereby corrected as shown below:

On the Title Page
    In column 1 (page 1 item 75, Inventors) Change "Swan Allan, Vancouver (CA);" to --Swan Allen, Vancouver (CA);--.

In the Specifications
    In column 10 at line 59, Change "made" to --made.--.
    In column 12 at line 4, Change "Request" to --Request:--.
    In column 12 at line 8, Change "Response" to --Response:--.

In the Claims
    In column 18 at line 9 (approx.), In Claim 16, Change "method," to --method, implemented--.
    In column 18 at line 48 (approx.), In Claim 20, Change "the the" to --the--.

Signed and Sealed this
Eighth Day of April, 2014

Michelle K. Lee
*Deputy Director of the United States Patent and Trademark Office*